TRANSPONDER-INTERROGATOR RANGEFINDER

Filed May 8, 1956 2 Sheets-Sheet 1

INVENTORS
HARRY VANTINE, JR.
EINAR C. JOHNSON

BY

ATTORNEYS

TRANSPONDER-INTERROGATOR RANGEFINDER

Filed May 8, 1956 2 Sheets-Sheet 2

INVENTORS
HARRY VANTINE, JR.
EINAR C. JOHNSON
BY
ATTORNEYS 2,894,258

TRANSPONDER-INTERROGATOR RANGEFINDER

Harry Vantine, Jr., Abington, and Einar C. Johnson, Hatboro, Pa.

Application May 8, 1956, Serial No. 583,602

17 Claims. (Cl. 343—6)

Figure 1:
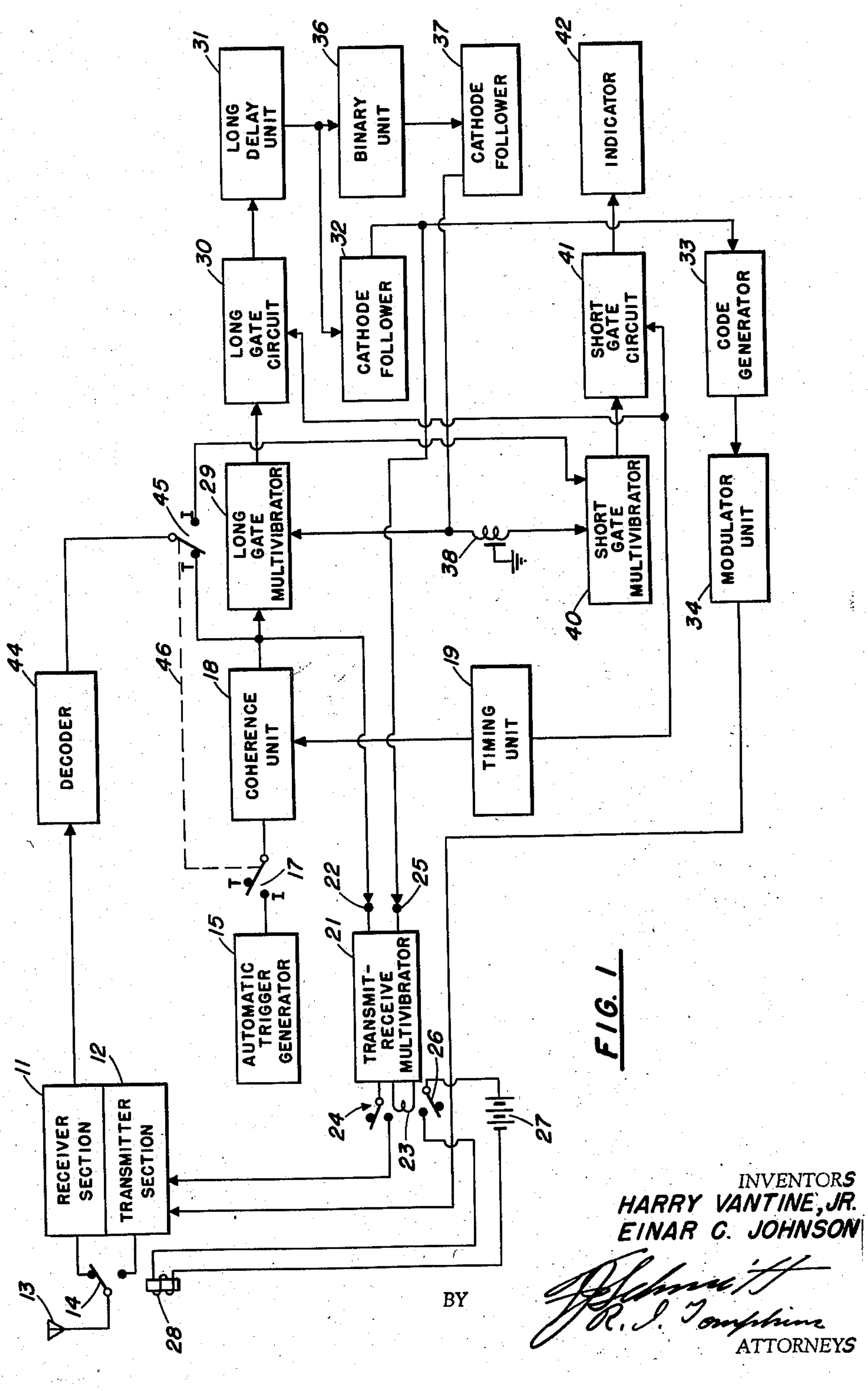

(Granted under Title 35, U.S. Code (1952), sec. 266)

The invention described herein may be manufactured and used by or for the Government of the United States of America for governmental purposes without the payment of any royalties thereon or therefor.

The present invention relates to a transponder-interrogator rangefinder which operates in conjunction with any existing radio communications system to provide a range indication.

The transponder-interrogator equipment of the present invention can be utilized in conjunction with any existing radio communications system consisting essentially of a transmitter, a receiver, and an antenna which may be common to both transmitter and receiver, or not, as desired. The function of the interrogator section is to initiate and cause the transmitter of the communications system to transmit a coded signal. This coded signal is received by another station set to operate as a transponder which decodes the signal, and after a given period of time, called the long delay, responds with a coded signal. Meanwhile, the interrogator has marked off a period of time equal to the afore-mentioned long delay, and after that time begins measuring time until the arrival of the reply from the transponder. The time interval between the end of the long delay and the arrival of the reply at the interrogator is directly proportional to the range between the transponder and the interrogator stations. An indicator is provided which converts this period of time into an indication of miles based on the speed of electromagnetic propagation. Without this long delay the employment of existing communications equipment for the ranging purpose on a single frequency in the radio spectrum would not be practical, because a finite period of time is required for any radio communication system operating on a single radio channel to change from the transmit condition to the receive condition and vice versa. Thus, this invention permits standard radio communications transmitters and receivers to function on a single carrier frequency as a range finding system to give an indication of the distance between any two points, mobile or fixed, equipped with 2-way radio communications equipment.

Accordingly, an object of the present invention is the provision of a transponder-interrogator system which can be utilized with conventional communications equipment to give an indication of range between two stations that are equipped with communications equipment and the present invention.

Another object is to provide an interrogator system which can be utilized with conventional communications equipment at one station to give an indication of range to another station having conventional communications equipment and also transponder equipment.

A further object of the invention is the provision of a transponder system at one station having conventional communications equipment which can be used with an interrogator system located at another station having conventional communications equipment to provide an indication of the distance between the two stations.

Figure 2:
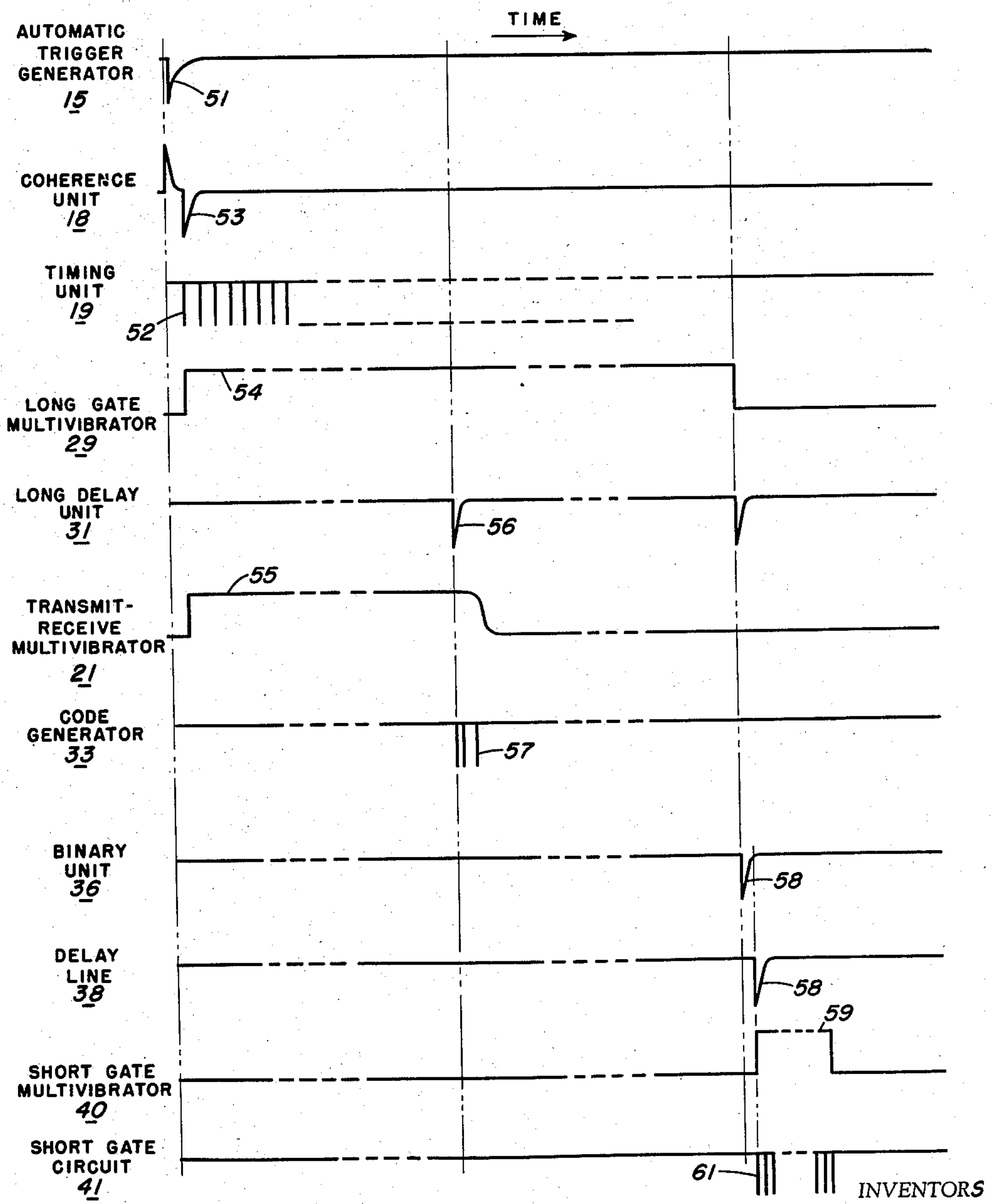

Other objects and many of the attendant advantages of this invention will be readily appreciated as the same becomes better understood by reference to the following detailed description when considered in connection with the accompanying drawings wherein:

Fig. 1 shows a block diagram of a preferred embodiment of the invention situated at a communications system station, and Fig. 2 comprises the timing chart which relates to the interrogation phase of the operation of the system shown in Fig. 1.

Referring now to the drawings, there is shown in Fig. 1 (which illustrates a preferred embodiment) a communications system comprising a receiver section 11, a transmitter section 12, an antenna 13, and a switch 14 for switching antenna 13 to either the receiver section 11 or the transmitter section 12. This communications system can be of nearly any type, and need not have only one antenna but can have one antenna for the receiver section and another for the transmitter section. In the transponder-interrogator system that is employed with this communications system, trigger generator 15 automatically produces trigger pulses at a rate equal to the frequency with which it is desired to determine range. When the single-pole double-throw switch 17, which can be any type on-off switch, is in the I position (the I represents "interrogator"), these trigger pulses are fed to coherence unit 18 which can comprise a multivibrator pulse generator followed by a differentiating circuit. The multivibrator starts producing a pulse when the trigger is received from trigger generator 15 and ends this pulse when the next successive trigger is received from the timing unit 19. Timing unit 19 comprises a frequency controlled source of trigger pulses which are generated at a repetition rate determined by the desired range accuracy. For example, if the repetition rate is such that the time interval or period between sucessive timing triggers corresponds to the time taken by a radio signal to traverse 2 miles in range (one mile going and one mile returning) then measurements in units of one mile in range can be made with this equipment. Typical operation would employ one nautical mile units in range and consequently the frequency of the timing unit trigger pulses would be 80.911 kc. s. The rectangular pulse from the multivibrator in coherence unit 18 is differentiated and thus a positive trigger is produced at the beginning of the rectangular pulse and a negative trigger at the end, but only the negative trigger constitutes the output trigger pulse of coherence unit 18. Coherence unit 18 produces a trigger coinciding with the next successive timing unit trigger pulse following the demand for this pulse by the trigger pulse from trigger generator 15; thus, a coincidence always exists between the trigger produced by coherence unit 18 and a timing unit trigger pulse. Of course in some applications of the transponder-interrogator system there may be no need of coincidence between the outputs of trigger generator 15 and timing unit 19 and then coherence unit can be omitted and the output of trigger generator 15 connected directly to the system components which coherence unit 18 would have fed.

The output trigger from coherence unit 18 is applied to the "transmit-receive" (T/R) multivibrator 21 at the "start trigger" terminal 22. This multivibrator is actually a "flip-flop" circuit that has a coil 23 of a relay 24, or the like, in the plate circuit of one of the tube elements. The normal operation of this "flip-flop" unit causes plate current to flow in that tube element upon reception of a trigger pulse at "start trigger" terminal 22 and to cease flowing upon receipt of a trigger pulse at "stop terminal"

25. Relay 24 operates to switch the communications system from its normal position of receive to the transmit position, and to maintain that system in the transmit position for a period of time equal to the time difference between reception of pulses at terminal 22 and terminal 25. Simultaneously, the relay contacts 26 apply energy from a voltage source 27 (shown in the diagram as a battery) to relay coil 28 to operate switch 14 which transfers the single antenna 13 from the receiver section 11 to the transmitter section 12.

The output trigger from coherence unit 18 is also applied to the input of long gate multivibrator 29 as a start trigger. Multivibrator 29 can be conventional and produces a rectangular pulse that is applied to long gate circuit 30 which is a conventional gate tube or other circuit in which a rectangular pulse can be applied to open the gate and permit the stage to pass whatever signal is applied at the signal terminal. In this case the signal consists of trigger pulses from timing unit 19. Hence, the output of long gate circuit 30 consists of timing triggers which are permitted to flow to the long delay unit 31 for the duration of the output pulse from long gate multivibrator 29.

Long delay unit 31 is essentially a pulse divider; i.e., a device for generating a single output pulse upon the reception of a predetermined number of input pulses. There are many possible circuits for performing this function, the most dependable of which is perhaps a cascaded series of bistable elements such as Eccles-Jordan "flip-flops." By cascading a sufficient number of these elements, it is possible to divide the frequency of the pulses from timing unit 19 by a number such that the period of the signal leaving long delay unit 31 is equal to the delay required. For example, if the pulse repetition frequency from timing unit 19 is 80.911 kc. s., thirteen bistable elements or "binaries" will divide this frequency by 8,192 and the output signal from long delay unit 31 will have a frequency of 80911 c.p.s. divided by 8192 or 9.876 c.p.s. Another possible long delay circuit is a magnetic tape recorder operating with a relatively short continuous strip of magnetic tape. Units of this type are available commercially for use in computers. Still another possible delay circuit makes use of the fact that the statistical average delay introduced by a simple multivibrator may, under suitable circumstances, be maintained at a given quantity with minor excursions. In this type of delay it is proposed to employ a simple multivibrator or phantastron circuit as a delay unit having $(1/n)$th of the total delay required. Following this multivibrator or phantastron circuit would be a series of cascaded division circuits, either of the binary type or circuits that divide by large numbers such as blocking oscillator circuits and other divider circuits. In this scheme, a division by $n$ is required so that the multivibrator or phantastron circuit is employed $n$ times in obtaining the long delay required. In this way, the statistical average over $n$ times is used rather than the single delay alone of the delay multivibrator or phantastron. The long delay circuit using cascaded binaries is a special case of this latter method where $n=8192$.

At the end of the long delay period, a trigger is produced at the output of long delay unit 31 which feeds through cathode follower 32 to the stop terminal 25 of the T/R multivibrator 21 and also feeds code generator 33 which generates the agreed-upon code. The code may consist of any combination of pulses, but the characteristics of these pulses are determined largely by the bandwidth of the receiver used to receive the coded signal. For optimum signal-to-noise ratio it is well known that the duration of the pulses or spaces between the pulses, whichever is shortest and hence critical, should be approximately 1.2 divided by the bandwidth of the communication equipment (usually the receiver limits the bandwidth of the system). The pulse width is measured in microseconds and the bandwidth in megacycles per second. Thus, if the receiver has a bandwidth of 100 kc. s. (0.1 mc. s.) then a pulse (or space) length of 12 microseconds is indicated. The code is applied to a carrier in modulator unit 34 and conducted to the transmitter section 12 for propagation. The type of modulation employed is open to free choice, but a frequency shift-keying type of modulation appears most desirable where it can be used.

The output trigger from long delay unit 31 is also applied to binary unit 36 which comprises a bistable element so that two input triggers (requiring two long delay periods) are required for this unit to produce an output trigger. Thus, an output trigger is derived from binary unit 36 after a delay of twice as long as that provided by long delay unit 31 in a single cycle of operation. Long delay unit 31 is stopped by a trigger pulse output from binary unit 36 that is fed through cathode follower 37 to an input of long gate multivibrator 29 as a stop trigger. This stop trigger ends the long pulse being produced by multivibrator 29 which would otherwise normally run somwhat longer. The cessation of this long pulse causes no more triggers to be fed from timing unit 19 through long gate circuit 30 and therefore long delay unit 31 also ceases operation. It is thus seen that long delay unit 31 is required to complete two long delay cycles before being stopped.

The output from cathode follower 37 also feeds delay line 38 which removes the error in the time measurements introduced by the duration of the pulse code from code generator 33 and also the code generator in the receiving station. In any code, the action initiated by the code does not take place until the complete code has been sent. There then exists an error between the time when the code was initiated and the time that the code can produce a recognition.

The output of error delay line 38 is fed as a start pulse to the short gate multivibrator 40 where it causes that unit to produce a rectangular pulse in its output circuit. This rectangular pulse continues until the short gate multivibrator is stopped by a recognition pulse from the transponder station. Hence, the duration of the rectangular pulse from multivibrator 40 is directly related to the time taken by the coded signal to travel in space from the interrogator station to the transponder station and return, and the time of this duration can be converted into a distance indication inasmuch as the speed of propagation of an electromagnetic wave is known. The duration or length of this pulse can be measured in many ways well known to the art and the pulse length can be displayed on various types of indicating devices, also well known to the art, and the indicator may then be calibrated directly in nautical miles or other desired units of measure. One suitable indicator is a short gate circuit 41 and indicator 42. The output pulse of multivibrator 40 energizes short gate circuit 41 to pass pulses from timing unit 19 during the duration of the short gate. Indicator 42 is an electronic counter employing bistable elements, or the like, arranged in a manner such that a decimal count is obtained. Such an arrangement is well known in the art and is available commercially in plug-in units. This type indicator requires timing unit 19 to generate triggers at a repetition rate of 80,911 pulses per second.

The recognition pulse from the transponder station is received by receiver 11, decoded by decoder 44, and then passed through switch 45, which is in the I position when switch 17 is in the I position due to mechanical linkage 46. The signal from switch 45 is fed to an input of multivibrator 40 to cause the termination of the square wave output, and therefore the duration of the rectangular pulse from multivibrator 40 is directly related to the code signal travel time, as explained above.

Referring now to the showing in Fig. 1 in relation to the showing in Fig. 2, to commence an interrogating operation, switch 17 and switch 45 are moved to the I position by manual or mechanical means. A trigger pulse 51 from generator 15 then "cocks" coherence unit 18, if this unit is employed, and the next occurring trigger pulse 52 from timing unit 19 cause a simultaneous trigger pulse 53 to be generated in the output of unit 18. This output trigger pulse initiates a square wave 54 in multivibrator 29 and also triggers T/R multivibrator 21 to produce a signal 55 which switches the communications system from a receiving to a transmitting operation. Since it takes a finite period of time for any radio communication station operating on a single radio channel to switch from a receive condition to a transmit condition and vice versa, a long delay is needed between the switching from receiving to transmitting and the transmission of a coded signal. The square wave 54 from multivibrator 29 allows trigger pulses from timing unit 19 to pass through long gate circuit 30 to the input of long delay unit 31. The frequency of the output pulses from timing unit 19 is known, and of course the time for the desired long delay is known, thus the number of pulses from unit 19 that must be fed to unit 31 until the desired time has expired can be readily calculated, and the elements of units 31 are arranged to generate an output pulse 56 when this calculated number of input pulses has been received. The output from unit 31 energizes code generator 33 to cause a carrier to be modulated in modulator unit 34 with a code 57 for propagation via transmitter section 12 and antenna 13. The same output from unit 31 also triggers T/R multivibrator 21 to terminate signal 55 which results in the switching of the communications system from transmit to receive. This switching requires a finite period of time, as stated above, and thus another long delay is required before the interrogator system is ready to receive. This long delay is provided in the interrogator system by the binary unit 36, and in the transponder system at the distant station by a long delay unit similar to unit 31. So, after another long delay, binary unit 36 produces an output pulse 58 that triggers multivibrator 29 to stop the long gate action. Delay line 38 produces a delay in pulse 58, and the delayed pulse triggers multivibrator 40 to initiate a square wave 59 which is employed for the time measurement. The responding signal from the distant station is detected and amplified by receiver section 11 and is decoded by decoder 44 and used to produce an output trigger pulse that triggers multivibrator 40 to terminate the square wave 59 that was being produced. During the period of this square wave, short gate 41 is energized to pass trigger pulses 61 from timing unit 19 to indicator 42 which counts the number of input pulses. Inasmuch as the period of the pulses from unit 19 is known beforehand, and indicator 42 has counted the number of pulses, the duration of the square wave 59 from multivibrator 40 can be readily calculated by multiplying this period by the number of pulses. The duration of this square wave is thus the length of time that the coded pulse from transmitter section 12 took to reach the transponder station pulse the length of time that is required for the coded pulse from the transponder to reach the interrogator station. Thus, the time duration of square wave 59 can be divided by two to find the length of time required for electromagnetic radiation to propagate from the interrogator station to the transponder station. Since the speed of electromagnetic waves is known, the distance between transponder and interrogator stations can be readily calculated, and as a practical matter indicator 42 is arranged to give a direct indication in distance.

The above interrogator unit can be converted into a transponder unit by means of switches 17 and 45 and mechanical linkage 46. If switches 45 and 17 are moved to the T position, it is to be noted that generator 15, unit 18, delay line 38, multivibrator 40, short gate circuit 41, and indicator 42 are either deactivated or lose their functions. Assuming switches 17 and 45 are in the T position, if a signal is received of the proper code from an interrogator station, this signal will be detected by receiver section 11 and decoded by decoder 44 which produces a trigger pulse that triggers T/R multivibrator 21 to switch the communications system from receive to transmit, and also triggers long gate multivibrator 29 which initiates the operation of long delay unit 31 in the same manner as described previously. After the long delay, the output of the long delay unit 31 is applied through cathode follower 32 to the code generator 33 which operates modulator unit 34 as previously described, and also this output feeds a stop trigger to T/R multivibrator 21 causing the transmitter section 12 to be stopped and the reseiver section 11 to start again. Thus, a signal was received and recognized, it was delayed an appropriate period of time in order to permit turn-around time for the local communications system as well as for the communications system of the interrogating station. A pulse code was then caused to be sent out via a carrier by the local transmitter section 12, and the local communications system was then turned back to the receiving condition for the reception of possible additional interrogations. The output from binary unit 36 and cathode follower 37 after two long delay time periods stops the action of long gate multivibrator 29 to render further reception possible.

As previously stated, timing unit 19 for each station is frequency controlled, as for example by means of a mechanically resonant system such as a quartz plate or tuning fork. Drift of frequency between the timing units in two stations, figuring in the exchange of range information, can cause errors in the range determination in a secondary way. Ordinarily, the timing units will be called upon to supply their triggers for measurement purposes for a small fraction of a second (depending upon the turn-around time of the transmitters and receivers involved). Hence, any difference in frequency between the timing units in two different stations will be multiplied by the fraction of a second through which the timing units are used for a single interrogation.

It will be apparent that interrogations cannot be made too frequently since a definite time is required for a single interrogation cycle to be accomplished. Typically, this time will amount to a few tenths of a second. There would be no reason to interrogate faster than the new information could be assimilated by the interrogating station and it is believed that one interrogation per second would prove useful in most cases. Where automatic equipment is to be operated without human assistance, such as in the guiding of pilotless aircraft and guided missiles in military requirements, it may be desirable to interrogate at the highest rate possible. Under these conditions, special transmitters and receivers would be used with extremely short turn-around times.

Although the disclosed preferred embodiment of the present invention can be used as either a transponder or an interrogator, it is believed apparent that at some stations it may not be desired to have the combined units and instead only the elements used in the interrogating function or in the transponder function would be needed. It has already been stated what units are utilized for each function, thus if only one function is desired, only those units necessary for that function need be included.

Obviously many modifications and variations of the present invention are possible in the light of the above teachings. It is therefore to be understood that within the scope of the appended claims the invention may be practiced otherwise than as specifically described.

What is claimed is:

1. A transponder-interrogator system comprising two substantially identical units, each of which is utilizable at a station with a communications system having a transmitter and receiver for giving an indication of the distance to another station having similar equipment, each of said units comprising: a first generator for producing a continuous output of trigger pulses at a frequency with which it is desired to determine range; a frequency-controlled generator for producing a continuous output of trigger pulses at a frequency determined by the desired range accuracy; an on-off switch; a coherence unit having two inputs, one of which is coupled by said on-off switch to the output of said first generator and the other of which is joined to the output of said frequency controlled generator, for producing a negative trigger pulse simultaneously with each pulse from said frequency-controlled generator that follows a pulse from said first generator; means, including a "transmit-receive" multivibrator having a "start" input and "stop" input, for causing said communications system to switch to transmitter operation when a trigger pulse is applied at the "start" input and for causing said communications system to switch to receiver operation when a trigger pulse is applied at the "stop" input; a lead connecting the output of said coherence unit to said "start" input; a long gate multivibrator for producing a rectangular pulse when pulsed by an output from said coherence unit; a long gate circuit having one input joined to the output of said long gate multivibrator and another input connected to the output of said frequency-controlled generator for passing the pulses from said frequency-controlled generator during the occurrence of a rectangular pulse from said long gate multivibrator; a long delay unit for producing a trigger pulse upon the reception of a predetermined number of pulses from said long gate circuit; a first cathode follower connected to the output of said long delay unit; a lead for connecting the output of said first cathode follower to said "stop" input of said "transmit-receive" multivibrator; a code generator for generating a predetermined code upon being pulsed by a trigger pulse from said first cathode follower; a modulator unit for modulating a carrier with the code from said code generator; a lead for conducting the output of said modulator unit to said transmitter for radiation of the modulated carrier; a binary unit for producing one output trigger pulse when fed by two trigger pulses from said long delay unit; a second cathode follower connected to the output of said binary unit; a lead connecting the output of said second cathode follower to an input of said long gate multivibrator whereby the action of said long gate multivibrator is stopped upon the occurrence of a pulse from said binary unit; a delay line connected to the output of said second cathode follower for removing time measurement errors introduced by the time duration of said predetermined code and coded received signals; a short gate multivibrator for producing a rectangular pulse when fed by a pulse from said delay line; a short gate circuit for passing trigger pulses from said frequency-controlled generator that occur simultaneously with a gate from said short gate multivibrator; an indicator for counting the trigger pulses passed by said short gate; a decoder unit connected to said receiver for detecting coded received signals having a certain code and for producing a trigger pulse in response thereto; and a single-pole double-throw switch system synchronized with said on-off switch for connecting the output of said decoder to said "start" input of said "transmit-receive" multivibrator and to the input of said long gate multivibrator when said on-off switch is in an "off" position, and for connecting the output of said decoder to an input of said short gate multivibrator when said on-off switch is in an "on" position whereby each trigger pulse from said decoder causes the rectangular pulse being produced by said short gate multivibrator to terminate.

2. A transponder-interrogator system comprising two substantially identical units, each of which is utilizable at a station with a communications system having a transmitter and a receiver for giving an indication of the distance to another station having similar equipment, each of said units comprising: a first frequency-controlled pulse generator for producing a continuous output of trigger pulses at a rate determined by the desired range accuracy; a second pulse generator which is synchronized by the output of said first pulse generator for producing trigger pulses at a rate equal to the frequency with which it is desired to determine range and in synchronism with trigger pulses from said first pulse generator; means responsive to the output pulses of said first and second pulse generators for producing a start trigger pulse, long gate circuit means responsive to said start trigger pulse for producing a gate pulse; means, including a "transmit-receive" multivibrator having a "start" input and a "stop" input, for causing said communications system to switch to transmitter operation when a trigger pulse is applied at the "start" input and for causing said communications system to switch to receiver operation when a trigger pulse is applied at the "stop" input; a lead for joining the output of said second pulse generator to said "start" input; a long gating circuit for passing pulses from said first pulse generator upon being gated by a gate pulse from said long gate circuit means; a long delay unit for producing a trigger pulse upon the reception of a predetermined number of pulses from said long gating circuit; conducting means for connecting the output of said long delay unit to said "stop" input of said "transmit-receive" multivibrator; code means for modulating a carrier with a predetermined code upon being pulsed by a trigger pulse from said long delay unit; a lead for conducting the output of said code means to said transmitter for radiation of the modulated carrier; a binary unit for producing one output trigger pulse when fed by two trigger pulses from said long delay unit; conducting means for connecting the output of said binary unit to an input of said long gating circuit for stopping the passage of pulses from said first pulse generator upon the occurrence of a pulse from said binary unit; a delay line connected to the output of said binary unit for removing time measurement errors introduced by the time duration of said predetermined code and coded received signals; a short gating circuit for passing trigger pulses from said first frequency controlled pulse generator when fed by a pulse from said delay line; an indicator for counting the trigger pulses passed by said short gate circuit; a decoder unit connected to said receiver for detecting coded received signals having a certain code and for producing a trigger pulse in response thereto; and a switch system having an interrogator position and a transponder position, and when in said interrogator position for joining the output of said decoder unit to an input of said short gating circuit for stopping the passage of trigger pulses therethrough upon the occurrence of a trigger pulse from said decoder unit, and when in said transponder position for stopping the operation of said second pulse generator and for connecting the output of said decoder unit to said "start" input of said "transmit-receive" multivibrator and to the triggering input of said long gating circuit.

3. A transponder-interrogator system comprising two substantially identical units, each of which is utilizable at a station with a communications system having a transmitter and receiver for giving an indication of the distance to another station having similar equipment, each of said units comprising: a frequency-controlled pulse generator system having a first output terminal and a second output terminal for producing a continuous output of trigger pulses on both output terminals wherein the trigger pulses on said first output terminal are in synchronism with but are of a much lower frequency than the trigger pulses on said second output terminal; means, including a multivibrator having a "start" input and a "stop" input, for causing said communications system to switch to transmitter operation when a trigger pulse is applied at the "start" input and for causing said communications system to switch to receiver operation when a trigger pulse is applied at the "stop" input; a lead for joining said first output terminal of said pulse generator system to said "start" input of said multivibrator; a long delay unit system for producing a single trigger pulse upon the reception of a predetermined number of pulses from said second output terminal after being triggered by a trigger pulse from said first output terminal; conducting means for conducting the output of said long delay unit system to said "stop" input of said multivibrator; code means for modulating a carrier with a predetermined code upon being pulsed by a trigger pulse from said long delay unit system; a lead for conducting the output of said code means to said transmitter for radiation of the modulated carrier; a binary unit for producing one output trigger pulse when fed by two trigger pulses from said long delay unit system; conducting means for conducting the output of said binary unit to an input of said long delay unit system for stopping the operation of said long delay unit system; a delay line connected to the output of said binary unit for removing time measurement errors introduced by the time duration of said predetermined code and coded received signals; a short gating and indicating circuit responsive to trigger pulses from said second output terminal and a trigger pulse from said delay line for providing an indication of the number of pulses from said second output terminal that occur after a trigger pulse from said delay line; a decoder unit connected to said receiver for detecting coded received signals having a certain code and for producing a trigger pulse in response thereto; and a switch system having an interrogator position and a transpodner position, and when in said interrogator position for joining the output of said decoder unit to an input of said short gating and indicating circuit for stopping the operation of said short gating and indicating circuit and when in said transponder position for stopping the generation of trigger pulses at said first output terminal of said pulse generator system and for connecting the output of said decoder unit to said "start" input of said multivibrator and to the input of said long delay unit system.

4. A transponder-interrogator system comprising two substantially identical units, each of which is utilizable at a station with a communications system having a transmitter and receiver for giving an indication of the distance to another station having similar equipment, each of said units comprising: a first frequency-controlled pulse generator system for producing a continuous output of trigger pulses at a rate equal to the frequency with which it is desired to determine range; control means for said communications system having a "start" input and a "stop" input for causing said communications system to switch to transmitter operation when a trigger pulse is applied at the "start" input and for causing said communications system to switch to receiver operation when a trigger pulse is applied at the "stop" input; first conduction means for joining the output from said first pulse generator to said "start" input; a second frequency controlled pulse generator for producing a continuous output of trigger pulses at a rate determined by the desired range accuracy; a long delay unit system for producing a single trigger pulse upon the reception of a predetermined number of pulses from said second pulse generator after being triggered by a trigger pulse from said first pulse generator; conducting means for conducting the output of said long delay unit system to said "stop" input of said control means; code means for modulating the carrier from said transmitter with a predetermined code upon being pulsed by a trigger pulse from said long delay unit system; pulse divider means for producing one output trigger pulse when fed by two trigger pulses from said long delay unit system; conducting means for conducting the output of said pulse divider means to an input of said long delay unit system for stopping the operation thereof; a delay line joined to the output of said pulse divider means for removing time measurement errors introduced by the time duration of said predetermined code and coded received signals; an indicating circuit responsive to the trigger pulses from said second pulse generator system and a trigger pulse from said delay line for providing an indication of the number of pulses from said second pulse generator system that occur following a trigger pulse from said delay line; a decoder unit connected to said receiver for detecting coded received signals having a certain code and for producing a trigger pulse in response thereto; and a switch system having an interrogator position and a transponder position and when in said interrogator position for joining the output of said decoder unit to an input of said indicating system for stopping the operation of said indicating system, and when in said transponder position for stopping triggering of said long delay unit system by trigger pulses from said first pulse generator system and for connecting the trigger pulses from said decoder unit to trigger said long delay unit system and also for joining the output of said decoder unit to said "start" input of said control means.

5. A transponder-interrogator system comprising two substantially identical units, each of which is utilizable at a station with a communications system having a transmitter and receiver for giving an indication of the distance to another station having similar equipment, each of said units comprising: a timing unit for producing a continuous output timing signal; long delay means responsive to said timing signal for producing output trigger pulses at predetermined time intervals after being energized by a trigger pulse; trigger pulse producing means for producing trigger pulses for energizing said long delay means; means responsive to trigger pulses from said trigger pulse producing means for causing said communications system to switch to transmitter operation; means for modulating the carrier from said transmitter with a predetermined code upon being pulsed by a trigger pulse from said long delay means; means responsive to trigger pulses from said long delay means for causing said communications system to switch to receiver operation; an indicator; pulse dividing means for producing one output trigger pulse when fed by two trigger pulses from said long delay means for causing a de-energizaton of said long delay means and for causing said indicator to be energized by said output timing signal; a decoder unit connected to said receiver for detecting received signals having a certain code and for producing a trigger pulse in response thereto; switch means having an interrogator position and a transponder position and when in said interrogator position for connecting the trigger pulses from said decoder unit to de-energize said indicator, and when in said transponder position for disconnecting said trigger pulse producing means from said long delay means and for connecting the trigger pulses from said decoder unit to said long delay means and to said means for causing said communications system to switch to transmitter operation.

6. A transponder-interrogator system comprising two substantially identical units, each of which is utilizable at a station with a communications system having a transmitter and receiver for providing an indication of the distance to another station having similar equipment, each of said units comprising: a pulse generator for producing trigger pulses, a timing unit for continuously producing an output timing signal, control means responsive to said trigger pulses for causing said communications system to switch to transmitter operation, code producing means responsive to said timing signal and said trigger pulses a predetermined time after being triggered by a trigger pulse for modulating the carrier from said transmitter with a predetermined code and for causing said communications system to switch to receiver operation, indicating means responsive to said code producing means and said timing signal for starting a timing indication process a time equal to said predetermined time after the operation of said code producing means, decoder means having an input connected to said receiver for detecting received signals having a certain code and for producing a trigger pulse in response thereto, and switch means for connecting the output of said decoder means either for pulsing said control means and said code producing means or for pulsing said indicating means to stop the timing indication process.

7. A transponder-interrogator system comprising: two substantially identical units each of which is utilizable at a station with a communications system having a transmitter and a receiver for giving an indication of the distance to another station having similar equipment, each of said units comprising: control means when pulsed at a "start" terminal for causing said communications system to switch to transmitter operation and when pulsed at a "stop" terminal for causing said communications system to switch to receiver operation, generator means for applying trigger pulses at said "start" terminal, code producing means for modulating the carrier from said transmitter with a code a predetermined time after said generator means applies a trigger pulse at said "start" terminal and for applying a trigger pulse at said "stop" terminal after this predetermined time, indicating means responsive to said code producing means for starting a timing operation a time equal to said predetermined time after the operation of said code producing means, decoder means for detecting signals received by said receiver and for producing a trigger pulse in response to received code signals, and switch means for connecting the output of said decoder means to apply trigger pulses either at said "start" terminal or at the input to said indicating means to stop said timing operation.

8. A transponder-interrogator combination for providing an indication of the distance between the transponder and the interrogator of the combination, said interrogator comprising: means for initiating and transmitting an interrogating code signal; said transponder comprising: means for receiving and decoding said interrogating code signal and for producing a first trigger signal in response thereto, and means responsive to said first trigger signal for transmitting a responding code signal a delay period after the occurrence of said trigger signal; said interrogator further comprising: means for marking off a period equal to said delay period after the transmission of said interrogating code signal, means for receiving and decoding said responding code signal and for producing a second trigger signal in response thereto, and means for measuring the time between the end of the period that was marked off and the occurrence of said second trigger signal thereby providing an indication of the distance between said interrogator and said transponder.

9. A transponder system for operation with a communications system having a transmitter and receiver, said transponder system comprising: a decoder unit connected to said receiver for detecting received signals having a certain code and for producing a trigger pulse in response thereto, control means having a "start" input terminal and a "stop" input terminal for causing said communications system to switch to transmitter operation when a pulse is applied at said "start" input terminal and for causing said communications system to switch to receiver operation when a pulse is applied at said "stop" input terminal, a long gate multivibrator having a first input and a second input for initiating a rectangular pulse when pulsed by a trigger pulse at said first input and for stopping said rectangular pulse when pulsed by a trigger pulse at said second input, a lead for connecting the output of said decoder unit to said "start" input terminal and to said first input terminal, a frequency controlled generator for producing a continuous output of trigger pulses, a long gate circuit having one input joined to the output of said long gate multivibrator and another input connected to the output of said frequency controlled generator for passing the pulses from said frequency controlled generator during the occurrence of a rectangular pulse from said long gate multivibrator, a long delay unit for producing a trigger pulse upon the reception of a predetermined nember of pulses from said long gate circuit, a cathode follower connected to the output of said long delay unit, a lead for connecting the output of said cathode follower to said "stop" input terminal, a code generator for generating a predetermined code upon being pulsed by a trigger pulse from said cathode follower, a modulator unit for modulating a carrier with the code from said code generator, a lead for conducting the output of said modulator unit to said transmitter for radiation of the modulated carrier, and means for applying a trigger pulse at said second input terminal of said long gate terminal a predetermined time after transmission of said modulated carrier.

10. A transponder system for operation with a communications system having a transmitter and a receiver, said transponder system comprising: a decoder unit connected to said receiver for detecting received signals having a certain code and for producing a first trigger pulse in response thereto, control means having a "start" input terminal and a "stop" input terminal for causing said communications system to switch to transmitter operation when said first trigger pulse is applied at said "start" input terminal and for causing said communications system to switch to receiver operation when a second trigger pulse is applied at said "stop" input terminal, long delay unit means for producing said second trigger pulse a predetermined time after being pulsed by said first trigger pulse, conduction means for conducting the output of said decoder unit to said "start" input terminal and the input terminal of said long delay unit means, code generator means for modulating a carrier with a code after being pulsed by said second trigger pulse, leads for conducting the output of said long delay unit means to said "stop" terminal and to the input of said code generator, and leads for conducting the output of said code generator to the input to said transmitter.

11. An interrogator system for operation with a communications system having a transmitter and a receiver, said interrogator system comprising: a first generator for continuously producing an output of trigger pulses at a rate equal to the frequency with which it is desired to determine range; a frequency controlled generator for continuously producing an output of trigger pulses at a frequency determined by the desired range accuracy; a coherence unit having two inputs, one of which is coupled to the output of said first generator and the other of which is joined to the output of said frequency controlled generator, for producing a negative trigger pulse simultaneously with each pulse from said frequency controlled generator that follows a pulse from said first generator; a "transmit-receive" multivibrator having a "start" input and a "stop" input for causing said communications system to switch to transmitter operation when a trigger pulse is applied at said "start" input and for causing said communications system to switch to receiver operation when a trigger pulse is applied at said "stop" input; a lead connecting the output of said coherence unit to said "start" input; a long gate multivibrator for producing a rectangular pulse when pulsed by an output from said coherence unit; a long gate circuit having one input joined to the output of said long gate multivibrator and another input connected to the output of said frequency controlled generator for passing the pulses from said frequency controlled generator during the occurrence of a rectangular pulse from said long gate multivibrator; a long delay unit for producing a trigger pulse upon the reception of a predetermined number of pulses from said long gate circuit; a first cathode follower connected to the output of said long delay unit; a lead for connecting the output of said first cathode follower to said "stop" input of said "transmit-receive" multivibrator; a code generator for generating a predetermined code upon being pulsed by a trigger pulse from said first cathode follower; a modulator unit for modulating a carrier with the code from said code generator; a lead for conducting the output of said modulator unit to said transmitter for radiation of the modulated carrier; a binary unit for producing one output trigger pulse when fed by two trigger pulses from said long delay unit; a second cathode follower connected to the output of said binary unit; a lead connecting the output of said second cathode follower to an input of said long gate multivibrator whereby the action of said long gate multivibrator is stopped upon the occurrence of a pulse from said binary unit; a delay line connected to the output of said second cathode follower for removing time measurement errors introduced by the time duration of said predetermined code and received coded signals; a short gate multivibrator for producing a rectangular pulse when fed by a pulse from said delay line; a short gate circuit for passing trigger pulses from said frequency controlled generator that occur simultaneously with a gate from said short gate multivibrator; an indicator for counting the trigger pulses passed by said short gate circuit; a decoder unit connected to said receiver for detecting received signals having a certain code and for producing a trigger pulse in response thereto; and conducting means for connecting the trigger pulse from said decoder unit to an input of said short gate multivibrator whereby the rectangular pulse produced by said short gate multivibrator is terminated.

12. An interrogator system for operation with a communications system having a transmitter and a receiver, said interrogator system comprising: a first frequency controlled pulse generator for continuously producing an output of trigger pulses at a rate determined by the desired range accuracy, a second pulse generator which is synchronized by the output of said first pulse generator for producing trigger pulses in synchronism with the trigger pulses from said first pulse generator and at a rate equal to the frequency with which it is desired to determine range, a "transmit-receive" multivibrator having a "start" input and a "stop" input for causing said communications system to switch to transmitter operation when a trigger pulse is applied at the "start" input and for causing said communications system to switch to receiver operation when a trigger pulse is applied at said "stop" input, a lead for joining the output of said second pulse generator to said "start" input, a long gating circuit for passing pulses from said first pulse generator upon being triggered by a trigger pulse from said second pulse generator, a long delay unit for producing a trigger pulse upon the reception of a predetermined number of pulses from said long gating circuit, conducting means for connecting the output of said long delay unit to said "stop" input of said "transmit-receive" multivibrator, code means for modulating a carrier with a predetermined code upon being pulsed by a trigger pulse from said long delay unit, a lead for conducting the output of said code means to said transmitter for radiation of the modulated carrier, a binary unit for producing one output trigger pulse when fed by two trigger pulses from said long delay unit, conducting means for connecting the output of said binary unit to an input of said long gating circuit for stopping the passage of pulses from said first pulse generator upon the occurrence of a pulse from said binary unit, a delay line connected to the output of said binary unit for removing time measurement errors introduced by the time duration of said predetermined code and received coded signals, a short gating circuit for passing trigger pulses from said first frequency controlled pulse generator when fed by a pulse from said delay line, an indicator for counting the trigger pulses passed by said short gate circuit, a decoder unit connected to said receiver for detecting received signals having a certain code and for producing a trigger pulse in response thereto, and conduction means for joining the output of said decoder unit to an input of said short gating circuit for stopping the passage of trigger pulses therethrough upon the occurrence of a trigger pulse from said decoder unit.

13. An interrogator system for operation with a communications system having a transmitter and a receiver, said interrogator system comprising: a frequency controlled pulse generator system having a first output terminal and a second output terminal for producing a continuous output of trigger pulses on both output terminals wherein the trigger pulses on said first output terminal are in synchronism with the trigger pulses on said second output terminal and have a rate equal to the frequency which it is desired to determine range, a multivibrator having a "start" input and a "stop" input for causing said communications system to switch to transmitter operation when a trigger pulse is applied at the "start" input and for causing said communications system to switch to receiver operation when a trigger pulse is applied at the "stop" input, a lead for joining said first output terminal of said pulse generator system to said "start" input of said multivibrator, a long delay unit system for producing a single trigger pulse upon the reception of a predetermined number of pulses from said second output terminal after being triggered by a trigger pulse from said first output terminal, conducting means for conducting the output of said long delay unit system to said "stop" input of said multivibrator, code means for modulating a carrier with a predetermined code upon being pulsed by a trigger pulse from said long delay unit, a lead for conducting the output of said code means to said transmitter for radiation of the modulated carrier, a binary unit for producing one output trigger pulse when fed by two trigger pulses from said long delay unit, conducting means for conducting the output of said binary unit to an input of said long delay unit system for stopping the operation of said long delay unit system, a delay line connected to the output of said binary unit for removing time measurement errors introduced by the time duration of said predetermined code and received coded signals, a short gating and indicating circuit responsive to trigger pulses from said second output terminal and a trigger pulse from said delay line for providing an indication of the number of pulses from said second output terminal that occur after a trigger pulse from said delay line, a decoder unit connected to said receiver for detecting received signals having a certain code and for producing a trigger pulse in response thereto, and conduction means for conducting each trigger pulse from said decoder unit to an input of said short gating and indicating circuit for stopping the operation of said short gating and indicating circuit.

14. An interrogator system for operation with a communications system having a transmitter and a receiver, said interrogator system comprising: a first pulse generator system for producing a continuous output of trigger pulses at a rate equal to the frequency with which it is desired to determine range, control means for said communications system having a "start" input and a "stop" input for causing said communications system to switch to transmitter operation when a trigger pulse is applied at said "start" input and for causing said communications system to switch to receiver operation when a trigger pulse is applied at said "stop" input, first conduction means for joining the output from said first pulse generator to said "start" input, a second pulse generator for producing trigger pulses at a rate determined by the desired range accuracy, a long delay unit system for producing a single trigger pulse upon the reception of a predetermined number of pulses from said second pulse generator after being triggered by a trigger pulse from said first pulse generator, conducting means for conducting the output of said long delay unit system to said "stop" input of said control means, code means for modulating the carrier from said transmitter with a predetermined code upon being pulsed by a trigger pulse from said long delay unit system, pulse divider means for producing one output trigger pulse when fed by two trigger pulses from said long delay unit system, conducting means for conducting the output of said pulse divider means to an input of said long delay unit system for stopping the operation thereof, a delay line joined to the output of said pulse divider means for removing time measurement errors introduced by the time duration of said predetermined code and received coded signals, an indicating circuit responsive to trigger pulses from said second pulse generator system and a trigger pulse from said delay line for providing an indication of the number of pulses from said second pulse generator that occur following a trigger pulse from said delay line, a decoder unit connected to said receiver for detecting received signals having a certain code and for producing a trigger pulse in response thereto, and conduction means for joining the output of said decoder unit to an input of said indicating system for stopping the operation thereof.

15. An interrogator system for operation with a communications system having a transmitter and a receiver, said interrogator system comprising: a timing unit for producing a continuous output timing signal, long delay means responsive to said timing signal for producing output trigger pulses at predetermined time intervals after being energized by a trigger pulse, trigger pulse producing means for producing trigger pulses for energizing said long delay means, means responsive to trigger pulses from said trigger pulse producing means for causing said communications system to switch to transmitter operation, means for modulating the carrier from said transmitter with a predetermined code upon being pulsed by a trigger pulse from said long delay means, means responsive to trigger pulses from said long delay means for causing said communications system to switch to receiver operation, an indicator, pulse dividing means for producing one output trigger pulse when fed by two trigger pulses from said long delay means for causing a de-energization of said long delay means and for causing said indicator to be energized by said output timing signal, a decoder unit connected to said receiver for detecting received signals having a certain code and for producing a trigger pulse in response thereto, and conduction means for connecting the trigger pulses from said decoder unit to de-energize said indicator.

16. An interrogator system for operation with a communications system having a transmitter and a receiver, said interrogator system comprising: a pulse generator for producing trigger pulses, a timing unit for continuously producing an output timing signal, control means responsive to said trigger pulses for causing said communications system to switch to transmitter operation, code producing means responsive to said timing signal and said trigger pulses a predetermined time after being triggered by a trigger pulse for modulating the carrier from said transmitter with a predetermined code and for causing said communications system to switch to receiver operation, indicating means responsive to said code producing means and said timing signal for starting a timing indication process a time equal to said predetermined time after the operation of said code producing means, a decoder means having an input connected to said receiver for detecting received signals having a certain code and for producing a trigger pulse in response thereto, and conduction means for connecting the output of said decoder means for pulsing said indicating means to stop the timing indication process.

17. An interrogator system for operation with a communications system having a transmitter and a receiver, said interrogator system comprising: control means when pulsed at a "start" terminal for causing said communications system to switch to transmitter operation and when pulsed at a "stop" terminal for causing said communications system to switch to receiver operation, generator means for applying trigger pulses at said "start" terminal, means for modulating the carrier from said transmitter with a code a predetermined time after said generator means applies a trigger pulse at said "start" terminal and for applying a trigger pulse at said "stop" terminal after this predetermined time, indicating means responsive to said code producing means for starting a timing operation a time equal to said predetermined time after the operation of said code producing means, decoder means for detecting signals received by said receiver and for producing a trigger pulse in response to received code signals, and conduction means for connecting the output of said decoder means to apply trigger pulses at an input to said indicating means to stop said timing operation.

References Cited in the file of this patent

UNITED STATES PATENTS

2,444,426 Busignies ............... July 6, 1948